Nov. 20, 1956     J. H. BOOTH ET AL     2,771,301
SECTIONALIZED STEERING KNUCKLE
Original Filed May 2, 1951     2 Sheets-Sheet 1
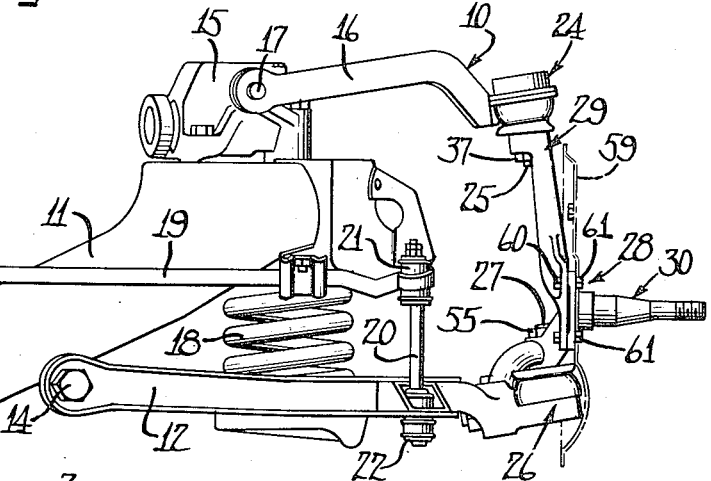
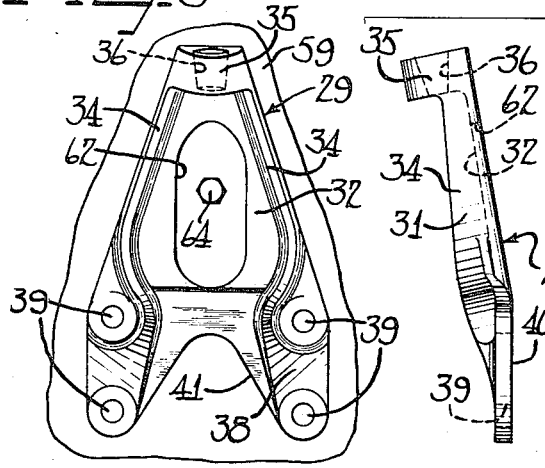
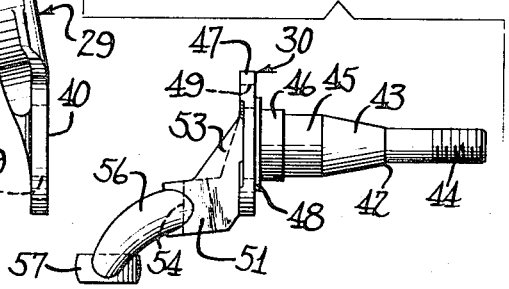
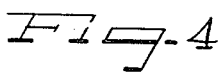
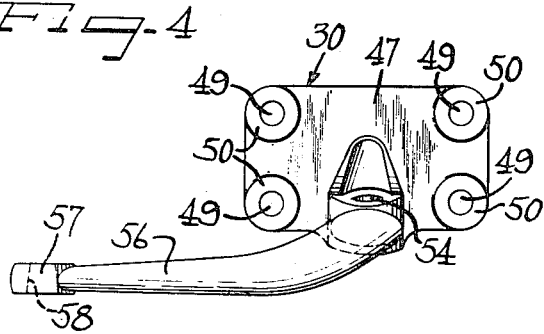
Inventors
James H. Booth
Albert W. Gair Nov. 20, 1956  J. H. BOOTH ET AL  2,771,301
SECTIONALIZED STEERING KNUCKLE
Original Filed May 2, 1951  2 Sheets-Sheet 2

Inventors
James H. Booth
Albert W. Gair
by ____ Attys

United States Patent Office 2,771,301
Patented Nov. 20, 1956

2,771,301

SECTIONALIZED STEERING KNUCKLE

James H. Booth, Detroit, and Albert W. Gair, Fraser, Mich., assignors to Thompson Products, Inc., Cleveland, Ohio, a corporation of Ohio Application February 9, 1956, Serial No. 564,499

9 Claims. (Cl. 280—96.2)

This invention relates to an improved steering knuckle construction for use in an independent steerable wheel suspension in a vehicle. More particularly, the invention relates to an improved and simplified steering knuckle assembly in which a separable spindle support bridge contains integral means at one end for pivotally attaching to the upper control arm of an independent wheel suspension and in which a separable wheel support spindle structure is fixedly attached to the support bridge and contains means for pivotally attaching to the lower control arm of the wheel suspension.

The present application is a division of our copending application Serial No. 224,172, filed May 2, 1951.

The steering knuckle assembly of the present invention comprises separable components which may be easily mass produced at a minimum cost. In addition, the components are arranged for expeditious assembly into the completed steering knuckle.

According to this invention an independent steerable wheel suspension, including upper and lower control arms pivotally mounted on an automobile frame and ball joints provided at the outer end of the control arms, has a spindle support bridge fixedly attached to the stud of the upper ball joint for pivoting of the support bridge relative to the upper control arm. An integral attachment pad is provided at the lower end of the support bridge for fixedly securing to an attachment pad of a wheel support spindle structure. An integral spindle extends outwardly at right angles to the spindle structure attachment pad and is provided with means for rotatably securing a vehicle wheel. A lower boss is affixed to the spindle structure attachment pad by being formed integral therewith or by being provided with means for fixedly securing it thereto. In either form of the lower boss, an integral steering arm may be extended therefrom for attaching to the steering linkage of the vehicle. The lower boss is fixedly secured to the stud of the lower ball joint for pivoting of the steering knuckle with respect to the lower control arm.

Ready access is provided to the face of a brake backing plate attached to the steering knuckle either by forming a relatively large access opening through the web of one form of the support bridge or by forming the central portion of the support bridge in semi-circular cross-section to prevent substantial obstruction to access. A generally V-shaped notch is provided in the support bridge attachment pad affording access clearance about the lower attachment boss.

It is, therefore, an object of the present invention to provide an improved steering knuckle assembly for use in an independent wheel suspension.

Another object of the invention is to provide a simplified steering knuckle asssembly including a separable spindle support bridge and a wheel support spindle support structure detachably secured thereto in a simplified manner.

A further object of the invention is to provide an improved steering knuckle assembly including efficient means for fixedly securing an upper control arm spindle support bridge to a lower control arm spindle structure.

Still another object of the present invention is to provide a steering knuckle construction for an independent steerable wheel suspension in which the components are easily and inexpensively formable.

A still further object of the invention is to provide a steering knuckle assembly including a spindle support bridge and a wheel support spindle structure including a lower boss affixed thereto with access clearance provided between the support bridge and the lower boss.

A specific object of the invention is to provide an improved steering knuckle assembly including a simplified spindle support bridge for pivotally attaching to the upper control arm of an independent wheel suspension and a separable wheel support spindle structure including an attachment pad, an integral spindle shank, a fixedly secured lower boss for pivotally connecting to the lower control arm of the wheel suspension and a steering arm integral with the boss.

Other objects, features and advantages of the present invention will be apparent from the following detailed description of various embodiments, by way of preferred examples only, taken in conjunction with the accompanying drawings.

On the drawings:

Figure 1 is a fragmentary front elevational view of an independent steerable wheel suspension for a vehicle including a steering knuckle assembly according to the present invention;

Figure 2 is an enlarged exploded front elevational view of the steering knuckle assembly of Figure 1 less the attachment bolts;

Figure 3 is an inside elevational view of the spindle support bridge shown in Figure 2 showing a broken away portion of the brake backing plate with a bolt in position for removal through a spindle support access opening;

Figure 4 is an inside end elevational view of the wheel support spindle structure shown in Figure 2;

As shown on the drawings:

Figure 8:
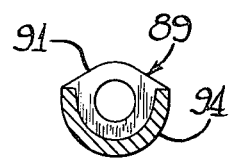
Figure 8 is a sectional view taken along line VIII—VIII of Figure 6 and showing the reinforcement shank configuration of this support bridge embodiment.

In Figure 1 is shown an independent steerable wheel suspension 10 of an automobile or the like including a cross frame member 11 and a lower control arm or load carrying arm 12 pivotally attached at its inner end portion to the frame member 11 by means of an attachment bolt 14. A shock absorber 15 is fixedly mounted on the upper side of the end portion of the cross frame member 11. An upper control arm 16 is pivotally and operatively attached at its inner end portion, as at 17, to the shock absorber 15. A coil support spring 18 is operatively disposed between the lower control arm 12 and the cross frame member 11 to resiliently transmit the weight of the automobile body (not shown) from the frame member 11 to the load carrying arm 12 and thence to a wheel (not shown). A torsion rod 19 is connected at one end portion to the lower control arm 12 outwardly of the spring 18 by means of a link 20 and associated attachment means 21 and 22.

A ball joint 24, of the controlled friction dampening type, has its casing fixedly attached to the outer end portion of the upper control arm 16 and has a stud 25 tiltably and rotatably retained in the ball joint with an attachment portion extending downwardly therefrom. An anti-friction load carrying ball joint 26 has its casing fixedly attached at the outer end portion of the lower control arm 12 and has a stud 27, tiltably and rotatably retained in the ball joint with an attachment portion extending upwardly therefrom. The studs 25 and 27 are in axial alignment.

According to the present invention, the steering knuckle assembly 28 includes a spindle support bridge 29 and a separable wheel support spindle structure 30, both preferably formed of forged steel or the like. The support bridge 29 has a body portion 31 including a web 32 and a pair of integral longitudinal reinforcement flanges or ribs 34. An integral attachment boss 35 is formed at the upper end of the body portion 31 and extends substantially perpendicularly inwardly with respect to the web 32. A longitudinally inwardly tapered stud attachment hole 36 is formed through the upper attachment boss 35. The tapered attachment hole 36 is adapted to receive a mating tapered portion (not shown) on the ball joint stud 25 for locking the stud in the tapered hole by means of a stud attachment nut 37.

An integral attachment pad 38 of roughly rectangular plan form is formed at the lower end of the spindle support bridge 29 and is provided with two pairs of bolt apertures 39 formed therethrough. An outwardly exposed face 40 is afforded by the attachment pad with the plane of the face roughly parallel to the axis of the tapered hole 36, the small angle therebetween being the "king pin angle." A V-shaped clearance or cutout 41 is formed in the lower margin of the attachment pad 38 between the two pairs of bolt apertures 39.

As shown in Figures 2 and 4, the wheel support spindle structure 30 comprises an elongated spindle shaft 42 with a tapered portion 43 and a reduced diameter externally threaded end portion 44 for receiving a wheel retaining nut (not shown). Inwardly of the tapered portion 43 is provided a cylindrical portion 45 succeeded inwardly by an increased diameter cylindrical portion 46. An integral attachment pad 47 of rectangular form is formed at the inner end of the shaft 42 perpendicular thereto and has an outwardly facing circular embossment 48 between the pad and the cylindrical portion 46. Four bolt holes or apertures 49 are provided through the attachment pad 47 in the same pattern as the bolt apertures 39 in the bridge attachment pad 38. Integral upstanding annular bosses 50 are provided on the inward face of the attachment pad 47 about the bolt apertures 49 to provide bearing pads thereabout.

The spindle structure 30 is formed with an integral lower attachment boss 51 extending inwardly from the inward face of the attachment pad 47 and generally perpendicular thereto, with the small angular deviation from perpendicular being equal to the "king pin angle." A pair of spaced reinforcement webs 53, 53 extend between the upper portion of the boss 51 and the face of the pad 47. A tapered stud attachment hole 54 is formed through the lower boss 51 and is adapted to receive a mating tapered portion (not shown) on the ball joint stud 27 in axial alignment with the upper stud 25. A nut 55 serves to secure the stud in the hole 54. An integral steering arm 56 extends generally rearwardly from the lower boss 51 and has an attachment portion 57 at the free end including a tapered hole 58 for fixedly receiving a tapered portion of an attachment pin (not shown) which is pivotally attached in the tie rod linkage (not shown) of vehicle.

In order to provide a brake support structure for a wheel (not shown) mounted on the wheel support spindle structure 30, a brake backing plate 59 (shown in phantom outline) is adapted for mounting against the outward face of the spindle attachment pad 47. As shown in Figure 1, the spindle support bridge 29, the spindle structure 30 and the brake backing plate 59 are assembled and secured together by pin means herein shown as mounting bolts 60 inserted through the mating bolt apertures 39 and 49 and provided with nut 61.

For providing free access to the face of the brake backing plate 59 opposing the web 32 of the support bridge 29, a longitudinally elongated access aperture or opening 62 is formed through the web. Thus, elements lying between the brake backing plate 59 and the web 32, such as a brake mechanism bolt 64, may be easily reached for adjustment or removal without necessitating removal of the brake backing plate 59 from the steering knuckle assembly and without the use of a special wrench or the like.

Figure 6:
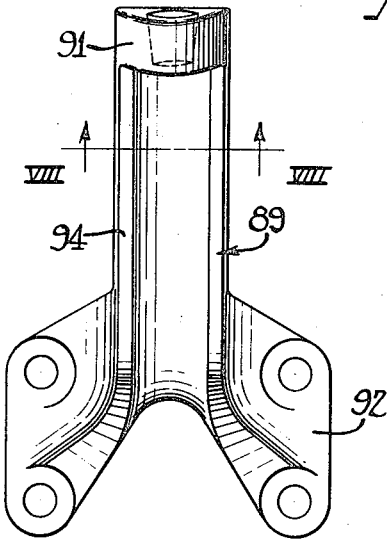
Figure 6 is an inside elevational view of the spindle support bridge shown in Figure 5.
Figure 5:
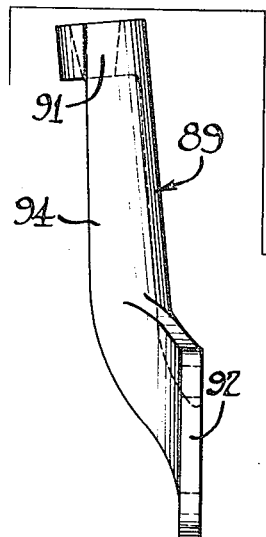
Figure 5 is an enlarged exploded front elevational view similar to Figure 2, but illustrating another embodiment of the steering knuckle assembly.
Figure 7:
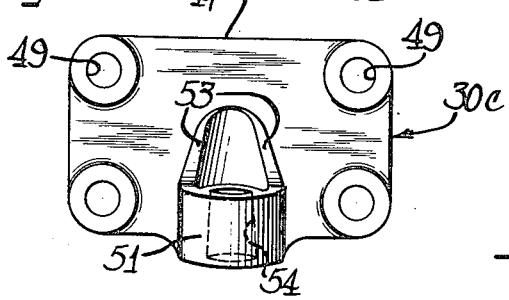
Figure 7 is an inside end elevational view of the wheel support spindle shown in Figure 5.

In Figures 5 to 8, inclusive, is illustrated another embodiment of the invention with a modified spindle support bridge 89 and a modified wheel support spindle structure 30c included in a modified steering knuckle assembly 90. The spindle structure 30c is the same as the spindle structure 30 except that the integral steering arm 56 has been eliminated. The support bridge 89 comprises an upper integral attachment boss 91, similar to the attachment boss 35 of the support bridge 29, and an integral attachment pad 92 with a reinforcing shank 94 of semi-circular cross-section (Fig. 8) connecting the attachment boss with the attachment pad. The attachment pad 92 is similar to the attachment pad 38 of the support bridge 29. The reinforcement shank 94 accomplishes the same purpose as the web 32 and the reinforcement ribs 34 of the bridge 29 in a considerably narrower structure so that there is no need for the provision of an access opening since the narrowness of the shank 94, together with its rounded outwardly facing surface, allows for easy access to the opposing surface of the brake backing plate.

It is to be noted that the support bridge 89 can be used in place of the support bridge 29 and vice versa depending upon the particular construction of the wheel suspension system in order to provide for variations in clearances, etc.

A separable steering arm of any suitable construction can be affixed to the steering knuckle assembly 90 by use of one or more attachment bolts or pins used for securing the attachment pads.

From the above description it will be readily understood that the present invention provides several embodiments of an improved steering knuckle assembly used in an independent steerable wheel suspension in a vehicle. The basic concept of simplicity of construction and ease of assembly is maintained in all of the modifications of the steering knuckle. A spindle support bridge containing upper ball joint connection means is formed separately from the wheel support spindle structure including lower ball joint connection means which may be integral or separable. The spindle structure may be provided with or without a steering arm affixed thereto. Ready access to the surface of the brake backing plate opposing the bridge is provided in all of the modifications either by forming an access aperture in a bridge web, or by forming a relatively narrow reinforcing bridge shank of substantially semi-circular cross-section. All of the various steering knuckle components are easily formable as by forging and require a minimum of machining. A substantial advantage is attained in that the connection means for the lower ball joint and the spindle shank, which receive most of the load, are formed as a small compact unit either by forming these portions as integral parts of the spindle structure or by affixing the portions in an efficient manner. One of the steering knuckle assembly modifications is shown without a steering arm, but a separate steering arm unit of conventional type can be provided as an additional unit and attached to the steering knuckle assembly as by one or more of the four bolts.

It will be understood that modifications and variations

We claim as our invention:

1. In an independent wheel suspension, a wheel support spindle structure comprising a spindle shank, an integral attachment pad substantially perpendicular to said spindle shank and having two sets of bolt apertures therethrough with integral annular embossments about said apertures on the side opposite said spindle shank, and an attachment boss fixedly interconnected with said attachment pad on the same side as said embossments between said sets of bolt apertures, said boss having a tapered hole therethrough generally perpendicular to said spindle shank.

2. In an independent wheel suspension, a wheel support spindle structure comprising a spindle shank, an integral attachment pad at the inner end of said spindle shank at right angles thereto and having a plurality of bolt apertures therethrough with integral annular bearing pads formed about each of said bolt apertures on the side of said attachment pad opposite to said spindle shank, an integral boss formed on said attachment pad and extending generally perpendicularly from said pad side, said boss having a tapered hole therethrough generally perpendicular to said spindle shank, and an integral steering arm extending from said boss.

3. In an independent wheel suspension, a wheel support spindle structure comprising a spindle shank, an integral attachment pad at one end of said spindle shank at right angles thereto and having a plurality of bolt apertures therethrough with integral annular bearing pads formed about each of said bolt apertures on the side of said attachment pad opposite to said spindle shank, and an integral boss formed on said attachment pad and extending generally perpendicularly from said pad side, said boss having a tapered hole therethrough generally perpendicular to said spindle shank.

4. In an independent wheel suspension, a spindle support bridge comprising a body portion including an integral boss extending substantially perpendicularly thereto at one end and an integral attachment pad at the other end with an integral reinforcement shank of generally semi-circular cross-section extending between said boss and said pad, said boss having a tapered hole therethrough generally parallel to said body portion, and said attachment pad having two sets of bolt apertures therethrough with a generally V-shaped cutout between the bolt aperture sets at the end opposite to said boss.

5. A steering knuckle assembly comprising a spindle support bridge having an integral attachment pad at one end and an integral boss extending substantially perpendicularly thereto at the other end, said attchment pad having a generally V-shaped cutout in the lower end portion thereof, means for fixedly securing the stud of an upper ball joint to said boss, a separable wheel support spindle structure including a spindle shank and an integral attachment pad, means fixedly interconnecting said support bridge pad with said spindle structure pad, said spindle structure having a lower boss fixedly interconnected therewith with said V-shaped cutout affording access clearance for the boss, steering arm means rigidly interconnected with said lower boss, and means for fixedly securing the stud of a lower ball joint to said lower boss.

6. A steering knuckle assembly comprising a spindle support bridge structure having an inwardly extending integral boss at its upper end and an integral attachment pad at its lower end, there being integral longitudinal reinforcement ribs extending between the boss and the pad, said boss having a tapered hole therethrough for fixedly receiving the stud of an upper arm ball joint, said attachment pad having a generally V-shaped cutout at its lower end and bolt apertures therethrough arranged on either side of said cutout, a separable wheel support spindle structure including a spindle shank and an integral attachment pad at right angles thereto, there being a plurality of bolt apertures through the pad arranged for alignment with the bolt apertures of said support bridge pad, and attachment pins in said bolt apertures fixedly interconnecting said support bridge pad with said spindle structure, a lower boss fixedly interconnected with said spindle structure and so arranged that said V-shaped cutout affords access clearance to the boss, said lower boss having a tapered hole therethrough for fixedly receiving the stud of a lower arm ball joint in axial alignment with the stud of the upper arm ball joint and having a steering arm fixedly interconnected therewith for controlling said spindle.

7. A steering knuckle assembly comprising a spindle support bridge structure having an integral boss at its upper end and an integral attachment pad at its lower end with integral longitudinal reinforcement ribs extending between the boss and the pad, said boss having a tapered hole therethrough for fixedly receiving the stud of an upper arm ball joint, a separable wheel support spindle structure including a spindle shank and an integral attachment pad at right angles thereto, and means fixedly interconnecting said bridge attachment pad with said spindle structure attachment pad, a lower boss fixedly interconnected with said spindle structure and having a hole therethrough axially aligned with the hole through said support bridge boss for fixedly receiving the stud of a lower arm ball joint and steering arm means fixedly interconnected with said lower boss.

8. A steering knuckle assembly comprising a spindle support bridge structure having an integral boss at its upper end and an integral attachment pad at its lower end, said attachment pad having a generally V-shaped cutout in the lower end portion thereof, means for fixedly securing the stud of said upper ball joint to said boss, a separable wheel support spindle structure including a spindle shank and an integral attachment pad, means fixedly interconnecting said support bridge pad with said spindle structure pad, a lower boss fixedly interconnected with said spindle structure and so arranged that said V-shaped cutout affords access clearance to the boss, and means for fixedly interconnecting the stud of a lower ball joint to said lower boss and steering arm means fixedly interconnected with said lower boss.

9. A steering knuckle assembly for supporting a wheel and a brake backing plate, said steering knuckle assembly comprising a spindle support bridge having attachment means at the upper end thereof and an integral attachment pad at the lower end thereof, said spindle support bridge having a central web provided with an access opening therethrough and with integral upstanding reinforcement ribs extending around said opening between said attachment means and said pad, a wheel support spindle structure having a spindle shank and an integral attachment pad with a lower attachment boss rigidly interconnected therewith for supporting the brake backing plate, and means fixedly interconnecting said attachment pads with each other, said support bridge access opening providing ready access to the face of said brake backing plate through said support bridge.

References Cited in the file of this patent

UNITED STATES PATENTS 2,652,264    Booth et al. _____ Sept. 15, 1953